United States Patent
Makke et al.

(10) Patent No.: US 11,620,830 B2
(45) Date of Patent: Apr. 4, 2023

(54) CONTEXT DEPENDENT TRANSFER LEARNING ADAPTATION TO ACHIEVE FAST PERFORMANCE IN INFERENCE AND UPDATE

(71) Applicant: Ford Global Technologies, LLC, Dearborn, MI (US)

(72) Inventors: Omar Makke, Lyon Township, MI (US); Oleg Yurievitch Gusikhin, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 16/836,766

(22) Filed: Mar. 31, 2020

(65) Prior Publication Data

US 2021/0303872 A1    Sep. 30, 2021

(51) Int. Cl.
*G06V 20/56* (2022.01)
*G06K 9/62* (2022.01)
*G05D 1/00* (2006.01)
*H04W 4/021* (2018.01)
*B60W 60/00* (2020.01)
*G06N 3/04* (2006.01)

(52) U.S. Cl.
CPC ....... *G06V 20/56* (2022.01); *B60W 60/00259* (2020.02); *G05D 1/0088* (2013.01); *G06K 9/6232* (2013.01); *G06N 3/04* (2013.01); *H04W 4/021* (2013.01); *B60W 2552/00* (2020.02); *B60W 2555/20* (2020.02); *G05D 2201/0213* (2013.01)

(58) Field of Classification Search
CPC ............ G06V 20/56; B60W 60/00259; B60W 2252/00; B60W 2555/20; G05D 1/0088; G05D 2201/0213; G06K 9/6232; G06N 3/04; H04W 4/021
USPC ........................................................ 382/104
See application file for complete search history.

(56) References Cited

U.S. PATENT DOCUMENTS

| | | | |
|---|---|---|---|
| 9,031,886 B2 * | 5/2015 | Heidasch | G06F 16/951 706/25 |
| 9,263,060 B2 * | 2/2016 | Sharp | G10H 1/0008 |
| 9,424,494 B1 * | 8/2016 | Lineback | G06T 7/11 |
| 2010/0156672 A1 * | 6/2010 | Yoo | B62D 15/0285 340/436 |

(Continued)

OTHER PUBLICATIONS

Kandaswamy, et al. "Improving Deep Neural Network Performance by Reusing Features Trained with Transductive Transference", DOI: 10.1007/978-3-319-11179-7_34, Sep. 15, 2014, 8 pages.

*Primary Examiner* — Yazan A Soofi
(74) *Attorney, Agent, or Firm* — Brandon Hicks; Kilpatrick Townsend & Stockton LLP

(57) ABSTRACT

Autonomous vehicles may utilize neural networks for image classification in order to navigate infrastructures and foreign environments, using context dependent transfer learning adaptation. Techniques include receiving a transferable output layer from the infrastructure, which is a model suitable for the infrastructure and the local environment. Sensor data from the autonomous vehicle may then be passed through the neural network and classified. The classified data can map to an output of the transferable output layer, allowing the autonomous vehicle to obtain particular outputs for particular context dependent inputs, without requiring further parameters within the neural network.

20 Claims, 8 Drawing Sheets

(56) References Cited

U.S. PATENT DOCUMENTS

| | | | |
|---|---|---|---|
| 2015/0106311 A1* | 4/2015 | Birdwell | G06N 3/08 |
| | | | 706/26 |
| 2016/0342890 A1* | 11/2016 | Young | G06N 3/08 |
| 2021/0001882 A1* | 1/2021 | Mortazavi | B60W 60/0011 |
| 2021/0046977 A1* | 2/2021 | Zhang | B60W 10/20 |
| 2022/0197306 A1* | 6/2022 | Celia | B25J 9/161 |

* cited by examiner

CONTEXT DEPENDENT TRANSFER LEARNING ADAPTATION TO ACHIEVE FAST PERFORMANCE IN INFERENCE AND UPDATE

BACKGROUND

Neural network models present great strides forward in computing technology. However, as neural network models get more advanced, the number of parameters continues to scale upwards. For example, in a convolutional neural network for image classification, a more and more developed neural network may require more parameters to reduce errors. While computers continue to get more and more powerful at computing, the higher amounts of computations will result in greater power consumption.

Autonomous vehicles are greatly able to utilize neural networks for image classification. By understanding its local environment, an autonomous vehicle is able to properly navigate the roads in a manner at least conforming to the standard driver, if not better. However, an autonomous vehicle may end up driving through many different environments, all with various factors affecting image classification. A neural network that can account for factors such as lighting, weather, and foreign signs would require far more parameters to accurately classify. As a result, a neural network accommodating the different factors can prove quite power hungry and have a large processing toll.

Vehicles are resource capped. Electric and hybrid vehicles are limited by physical dimensions of the computing modules because the larger packaging may result in more emissions. Non-electric vehicles may be power limited because they run off a 12-volt battery in addition to the physical dimensions of the computing modules. Accordingly, an overly expansive neural network that is trained for all scenarios becomes unfeasible. Thus there is a need for an energetically feasible neural network for autonomous vehicles.

SUMMARY

Generally, a context-dependent transfer learning adaptation in autonomous vehicles is described. For autonomous vehicles, relying on a neural network to process sensory input data requires accounting for lighting changes and local environment specific cues. A neural network used for navigating an infrastructure with a transferable output layer may improve accuracy of mapping infrastructure-specific inputs to desired outputs while the autonomous vehicle is operating as well as reduce energy consumption of running the neural network.

In embodiments, a method is described, where an autonomous vehicle receives a transferrable output layer for a neural network. The transferrable output layer may have environment-specific actions for an infrastructure, and the transferrable output layer is then mapped to the output layer of the neural network. The autonomous vehicle may receive and classify sensor data from a sensor to determine an appropriate output for a particular infrastructure-specific input.

In some embodiments, the sensor may be a vision sensor, such as a camera.

In some embodiments, the neural network of the autonomous vehicle may be on an application-specific integrated circuit chip, and the transferrable output layer of the neural network may reside on a different chip. The other chip may be a field-programmable gate array or a graphics processor unit.

In some embodiments, the transferrable output layer is received from an infrastructure, such as a parking garage. In other embodiments, the transferrable output layer is received from a geofence area.

The output action may be executed after it is determined based off the input data. Alternatively, the output action may be put on a visual display of the autonomous vehicle.

The autonomous vehicle may connect to the infrastructure via wireless network, and request the transferrable output layer by the same wireless network.

The transferrable output layer may be mapped to the output of the neural network by storing environment-specific actions into the memory of the computer system, and configuring a field programmable gate array to map output actions of the neural network to the environment-specific actions.

In embodiments, a system is described with an application-specific integrated circuit, one or more processors, and a system memory. The memory may store instructions to implement receiving a transferrable output layer for a neural network of the autonomous vehicle with environment-specific actions for an infrastructure, mapping the transferrable output layer into an output layer of the neural network, receiving and classifying sensor data from a sensor, and determining an output action based on the classification of the sensor data.

In some embodiments, the application-specific integrated circuit may be responsible for receiving and processing sensor data. This may be done through a convolutional neural network or otherwise.

The processors may include a graphics processing unit or a field programmable gate array.

In some embodiments, the sensor of the system may be a vision sensor.

In some embodiments, the transferrable output layer may include conditions of a local environment. The transferrable output layer may be received by an infrastructure such as a parking garage. In other embodiments, the transferrable output layer can be received from a geofence area.

In some embodiments, an infrastructure is described with a database for storing at least one transferable output layer for a neural network of an autonomous vehicle, a sensor, a communication system, and a memory. The memory may store instructions to analyze an autonomous vehicle using a sensor, selecting a suitable transferable output layer for the vehicle based off sensor data, and sending the transferable output layer to the autonomous vehicle.

In some embodiments, the sensor may receive data about weather conditions. In other embodiments, the sensor may receive data about the autonomous vehicle, such as make, model, capabilities, or otherwise.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the descrip

DETAILED DESCRIPTION

A context-dependent transfer learning adaptation in autonomous vehicles is described. Some embodiments of the system have a transferable output layer in order to map context-specific inputs, such as weather conditions, particular signs, or regulations of the infrastructure to specific outputs of the embedded neural network used within the autonomous vehicle for navigation within the infrastructure. An infrastructure system may determine when an autonomous vehicle enters its proximity, which transferable output layer would be suitable for operation in the infrastructure, and may transfer an output layer, for example, particularized for dim lighting or snow. This transferred output layer may use particular outputs within the autonomous vehicle's neural network to map to a response of the transferred output layer based on a particular input.

In autonomous vehicles utilizing a neural network for their autonomous driving capabilities, a transferrable output layer reduces the number of parameters accounted for by a neural network, while still allowing the neural network to accurately classify local cues. The infrastructure-specific transfer layers can be tailored to ensure an autonomous vehicle is able to properly respond to infrastructure-specific cues as well as properly classify such cues in different lighting conditions.

A neural network in an autonomous vehicle can be distributed on multiple hardware components to obtain higher efficiency outputs while further reducing energy consumption, component dimensions, and weight of the neural network. For example, the portion of the neural network that is responsible for convoluting various feature maps received by a vision sensor and pooling the feature maps may be put on an efficient ASIC chip. The fixed portion of the neural network does not need to be capable of learning capabilities, as the autonomous vehicle will be converting sensor data into feature maps through the convolutional layers for all inputs. The configurable portion of the neural network may then be put on a GPU or FPGA, improving the overall neural network efficiency, while still allowing for learning models within the autonomous vehicle.

Figure 1:
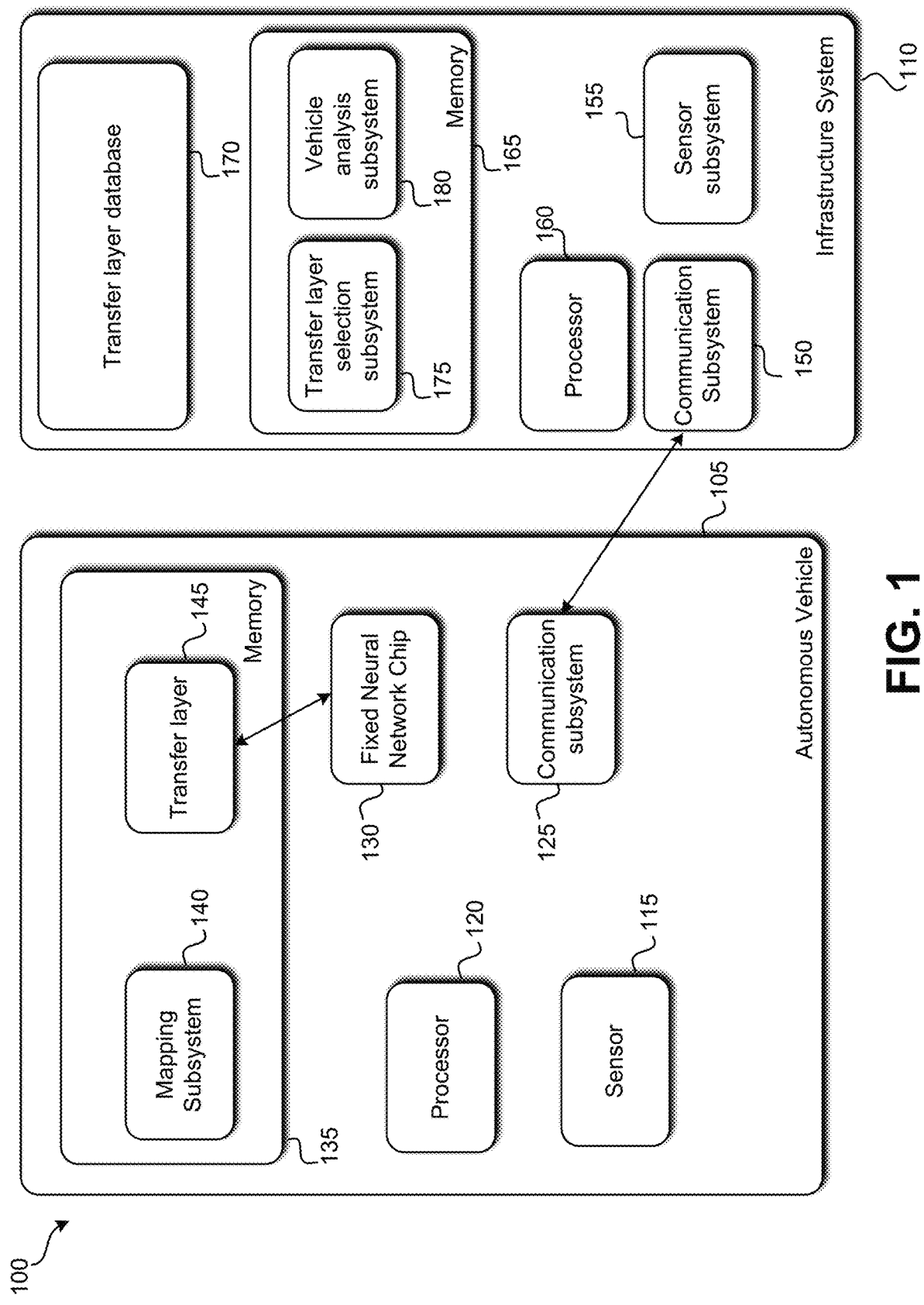
- FIG. 1 illustrates an intelligence system for incorporating a transferrable, infrastructure-specific output layer into an autonomous vehicle, according to embodiments.

FIG. 1 displays an illustration of an intelligence system 100 for context-dependent transfer learning adaptation, according to embodiments. An intelligence system 100 includes an autonomous vehicle 105 and an infrastructure system 110. Intelligence system 100 may be used to transfer a transferrable output layer from the transfer layer database 170 of infrastructure system 110 to the memory 135 of autonomous vehicle 105 to map specific outputs of autonomous vehicle 105 for context-specific actions within infrastructure system 110.

Autonomous vehicle 105 includes sensor 115, processor 120, a communication subsystem 125, a fixed neural network chip 130, and a memory 135. Processor 120 may execute instructions stored in memory 135 to perform the described functionality herein. Communication subsystem 125 may be capable of sending and receiving information to and from, for example, communication subsystem 150 of infrastructure system 110. While only specific components of autonomous vehicle 105 are described herein, autonomous vehicle 105 includes many other components left out of this description for simplicity. For example, autonomous vehicle 105 includes components for driving, such as tires, a drivetrain, an engine, etc. Autonomous vehicle 105 may also include other components, subsystems, or instructions in memory 135 that are left out for simplicity of description of the functionality described herein.

Sensor 115 may include sensors for gathering information about the surroundings of autonomous vehicle 105, such as, for example, vision sensors (e.g., backup camera, and other cameras for obtaining images of the vehicle surroundings), sonar sensors, and/or light detection and ranging (LIDAR) sensors. Data from sensor 115 may be passed to fixed neural network chip 130.

Fixed neural network chip 130 may be a convolutional neural network model capable of image processing, by any suitable means. Fixed neural network chip 130 may be a fully interconnected neural network model. In embodiments, fixed neural network chip 130 may be stored and executed from a hardware component, such as, for example, an application-specific integrated circuit (ASIC), field-programmable gate array (FPGA), graphics processing units (GPU), or other hardware accelerator. To gain the benefit of the most resource savings, the fixed neural network chip 130 may be an optimized ASIC, or other dedicated hardware which is an efficient, low power component. An ASIC, for example, is much more efficient and smaller in size than an FPGA and substantially more efficient than a GPU. The fixed neural network chip 130, and specifically the fixed portion of the neural network is described in more detail with respect to FIG. 5.

Memory 135 includes mapping subsystem 140 and transfer layer 145. Transfer layer 145 may be communicable with fixed neural network chip 130 in any suitable way. While certain subsystems are described herein for ease of description, memory 135 may include more or fewer subsystems to perform the functionality described herein.

Mapping subsystem 140 may take a transferrable output layer received from infrastructure system 110 and map the transferrable output layer to transfer layer 145. The mapping subsystem 140 may take information received from sensor 115 as parameters of the neural network of the autonomous vehicle 105 in mapping to transfer layer 145.

Transfer layer 145 may be mapped to an output layer of fixed neural network chip 130. The output layer of the fixed neural network chip 130 and/or the transfer layer may be stored on a configurable hardware component such as a FPGA or GPU in some embodiments rather than directly in memory 135. Transfer layer 145 may take a superset of outputs the autonomous vehicle 105 is capable of via the fixed neural network and have them mapped by mapping subsystem 140 to a specific subset of actions, based on the transferrable output layer received from infrastructure system 110.

Infrastructure system 110 has a communication subsystem 150, a sensor subsystem 155, a processor 160, a memory 165, and a transfer layer database 170. The processor 160 may execute instructions stored in memory 165 to perform the described functionality herein. Communication subsystem 150 may be capable of sending and receiving information to and from, for example, communication subsystem 125 of autonomous vehicle 105 using any suitable protocol. Infrastructure system 110 may be a computing system that oversees an infrastructure area. The infrastructure area may be a parking garage, a parking lot, a geofenced area, an airport facility, a trucking facility, a loading bay, or otherwise. A geofenced area can include any area with a predefined boundary such as a city, an amusement park, a gated neighborhood, a zoo, a park, or otherwise. While only specific components of infrastructure system 110 are described herein, infrastructure system 110 may include many other components left out of this description for simplicity. For example, infrastructure system 110 may be a parking garage with the necessary components for gated entry, such as a ticket booth, attendant gate or the like. In other embodiments, infrastructure system 110 may oversee a geofenced area with necessary components for an intended functionality, such as monorail tracks, direction signs and gated entry for an amusement park. Infrastructure system 110 may further include other components, subsystems, or instructions in memory 165 that are left out for simplicity of description of the functionality described herein.

Sensor subsystem 155 may include sensors suitable for detecting objects, such as vehicles, surface conditions due to snow and rain, or when the parking area is an opened lot, using sensors around the perimeter of infrastructure system 110 or otherwise. In embodiments, sensor subsystem 155 may be cameras meant to detect autonomous vehicle 105, snow, rain, open parking areas, or otherwise. In some embodiments, autonomous vehicle 105 transmits a signal to infrastructure system 110 to indicate its presence. The sensor subsystem 155 may be particularly suited for analyzing conditions within the infrastructure system 110.

Transfer layer database 170 may be a database of transferrable output layers, stored for specific parameters and conditions within infrastructure system 110. The transferrable output layers stored in transfer layer database 170, may be tailored for particular conditions. For example, the transferrable output layer may be particularly suitable for types of vehicles like trucks, sedans, low-profile cars, limousines, vans, etc. Transferrable output layer may be suitable for environmental conditions such as rain, snow, icy roads, fog, glare, shade, or otherwise. Transferrable output layer may take into account signs and cues specific to infrastructure system 110, such as signs indicating exit locations, pedestrian crossings, or unique signs that may be inside infrastructure system 110.

The transferable output layers may utilize output capabilities of the autonomous vehicle 105 for the output layer of the neural network that transfer layer 145 is mapped to. For example, autonomous vehicle 105 capabilities may include instructions on driving, turning, stopping, watching for pedestrians or animals, reversing, honking, or otherwise. The transferable output layer may map these capabilities to form outputs based on received sensory data from sensor subsystem 155. For example, a sensory input of a stop sign may result in the transfer layer mapping a "stop" output for 3 seconds, followed by a "check for cars" output, followed by a "drive" output.

Memory 165 may have a transfer layer selection subsystem 175 and a vehicle analysis subsystem 180. While certain subsystems are described herein for ease of description, memory 165 may include more or fewer subsystems to perform the functionality described herein.

Vehicle analysis subsystem 180 may take input data from sensor subsystem 155 and communication subsystem 150 for input data about autonomous vehicle 105. Vehicle analysis subsystem 180 may receive information such as car make, car model, or information about the autonomous vehicle's neural network.

Transfer layer selection subsystem 175 may receive data from vehicle analysis subsystem 180 to select a transfer layer from transfer layer database 170. Transfer layer selection subsystem 175 may also take into account local environmental specific conditions, such as lighting conditions of day or night, current weather and precipitation, and others as may be suitable in selecting a transferrable output layer for a particular autonomous vehicle 105. Transfer layer selection subsystem 175 may use sensors of sensor subsystem 155 to determine environmental classifications of a suitable transfer layer to send to autonomous vehicle 105. Transfer layer selection subsystem 175 may use sensor data of sensor subsystem 155 as inputs for a separate classification system. For example, inputs into transfer layer selection subsystem 175 may result in particular outputs, such as particular weather conditions (e.g., Day: 100% Snow: 80%; Night: 90% Snow: 20%; Night: 70% Rain: 30%; etc). The appropriate transfer layer is selected after an analysis of the inputs from sensor subsystem 155. In some embodiments, the transfer layer selection subsystem 175 may receive the environment conditions from the vehicle sensor 115 for analysis. Transfer layer selection subsystem 175 may also obtain information through a user input or through an updating application programming interface (API) for weather. Transfer layer selection subsystem 175 may utilize algorithms for selection of a transfer layer. After selecting a transferrable output layer, the memory 165 may send the transferrable output layer to autonomous vehicle 105 by communication subsystem 150.

In some embodiments, the infrastructure system 110 may utilize processor 160 to control signs. The signs may include a dynamically-updating sign, such as a sign that is powered by LEDs. The infrastructure system 110 may update the signs to readable inputs that map the transferrable output layer to an output layer of autonomous vehicle 105.

In some embodiments, the selection of a particular trained transfer layer by transfer layer selection subsystem 175 reduces the need for an overly developed neural network of autonomous vehicle 105. For example, there is no need to have a trained module on fixed neural network chip 130 to account for snow, and the module for snow can instead be stored directly in a particular transferrable output layer within transfer layer database 170, for use by autonomous vehicle 105 only when there are snowy conditions. When autonomous vehicle 105 is not using a transferrable output layer from an infrastructure, autonomous vehicle 105 may have a trained set of default outputs based on particular inputs. By reducing the complexity required of the neural network of autonomous vehicle 105, a smaller neural network can be placed on fixed neural network chip 130, with the mappable outputs relegated to the downloaded transfer layer for transferred learning in context-specific environments. The smaller neural network may lead to lower energy costs, reduced packaging size, weight, power consumption, and total cost of the neural network within autonomous vehicle 105, as well as reduce processing power required in running a fully developed neural network. The transfer layer 145 where the outputs are mapped may be on configurable hardware such as a GPU or FPGA, while the portion of the neural network responsible for image classification may be on a low power ASIC chip in order to help reduce power consumption and boost efficiency.

Figure 2:
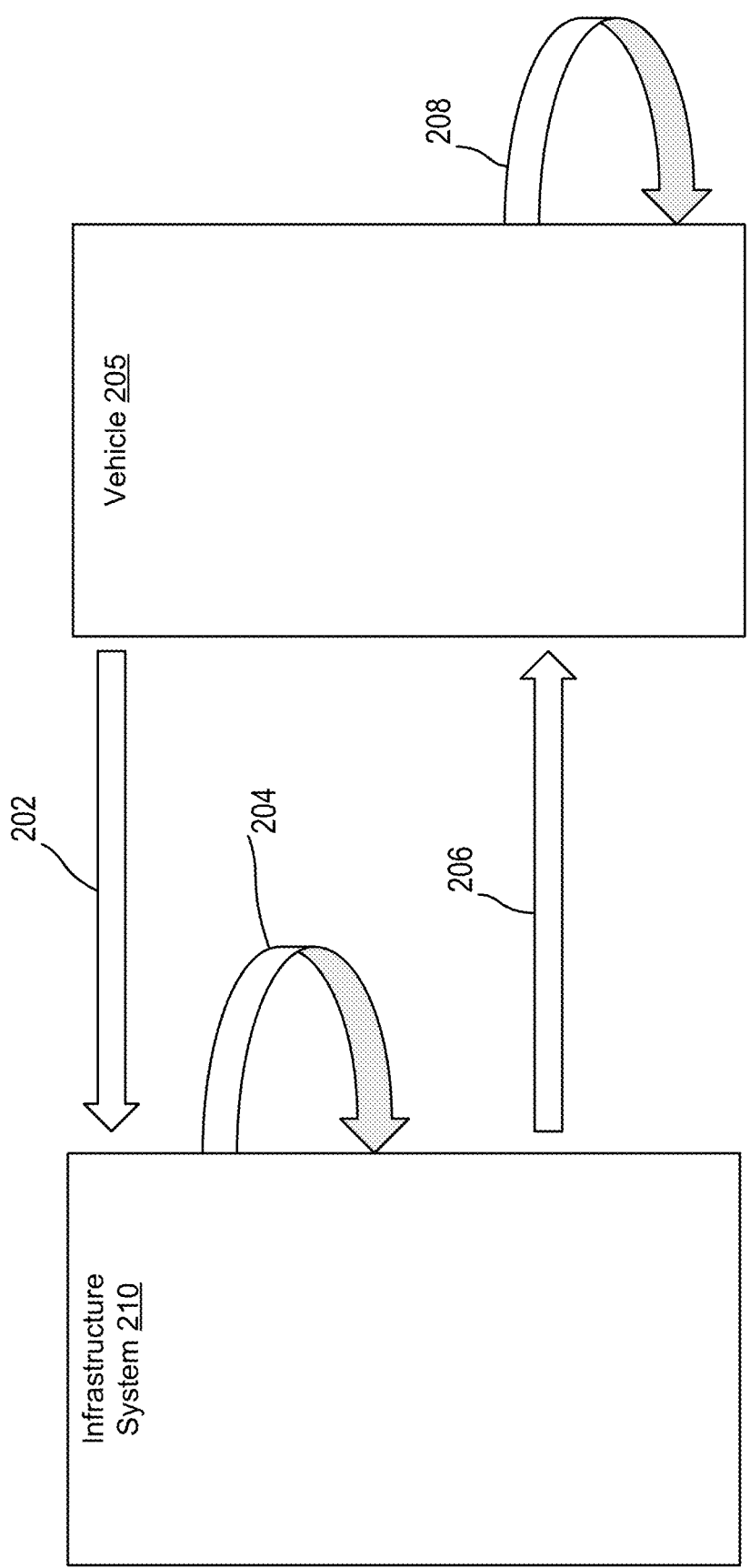
FIG. 2 illustrates a flow of data between an autonomous vehicle and an infrastructure system, according to embodiments.

FIG. 2 is an illustration of the progression of data flow between autonomous vehicle 205 and infrastructure system 210 according to embodiments. Autonomous vehicle 205 can be autonomous vehicle 105, and infrastructure system 210 can be infrastructure system 110. The progression of data flow may begin with vehicle 205 sending data packet 202 to infrastructure system 210 by a communication means (e.g., communication subsystem 150). After infrastructure system 210 receives data packet 202, infrastructure system 210 may use data packet 202 to make a selection in transfer layer selection step 204 from a transfer layer database (e.g., transfer layer database 170). The transfer layer selection may use subsystems within the memory of infrastructure system 210, such as transfer layer selection subsystem 175 and vehicle analysis subsystem 180. Infrastructure system 210 may then send a transfer layer 206 back to autonomous vehicle 205. Autonomous vehicle 205, after receiving transfer layer 206, may replace an output model in step 208. Transfer layer may be transfer layer 145.

In embodiments, sending data packet 202 may occur after an autonomous vehicle 205 approaches an infrastructure system 210 and communicates its presence. This communication may be by a communication system (e.g., communication subsystem 125, communication subsystem 150) of any suitable protocol. Data packet 202 may contain information about autonomous vehicle 205 such as hardware specifications, including but not limited to, autonomous vehicle's 205 random-access memory (RAM), central processing unit (CPU), CPU utilization, graphics processing unit (GPU), GPU utilization, Neural Net version, the number of parameters for the neural net version, and otherwise. Data packet 202 may also contain capabilities of autonomous vehicle 205, including but not limited to, detecting stop signs, detecting pedestrians, detecting vehicles, driving, honking, reversing, parallel parking capabilities, electric charging, and otherwise.

Once data packet 202 is received by infrastructure system 210, infrastructure system 210 may make a selection in transfer layer selection step 204, by running analysis systems on the data to determine a best transferable output layer suited for autonomous vehicle 205, taking in to account both data packet 202 as well as local environmental specific conditions, such as day or night, current weather and precipitation, local environment-specific rules and regulations, or as otherwise described above. The analysis systems may be transfer layer selection subsystem 175 and vehicle analysis subsystem 180. The transferrable output layer may be particularly suitable for a specific make and model of vehicle. The transferrable output layer may be learned beforehand and stored in a transfer layer database of infrastructure system 210.

Once a suitable transfer layer 206 is selected in transfer layer selection step 204, infrastructure system 210 may send the model to vehicle 205 by a communication system of any suitable protocol, such as communication subsystem 150 and communication subsystem 125.

In some embodiments, autonomous vehicle 205 may have a neural network with an output layer that is transferrable (e.g., transfer layer 145). After receiving transfer layer 206, autonomous vehicle may map transfer layer 206 to an output layer of the neural network of autonomous vehicle 205 on a hardware component such as a GPU or FPGA. Transfer layer 206 may use the capabilities of autonomous vehicle 205 as discussed above as a superset to map out individual actions depending on context-specific inputs for the infrastructure system 210.

Figure 3:
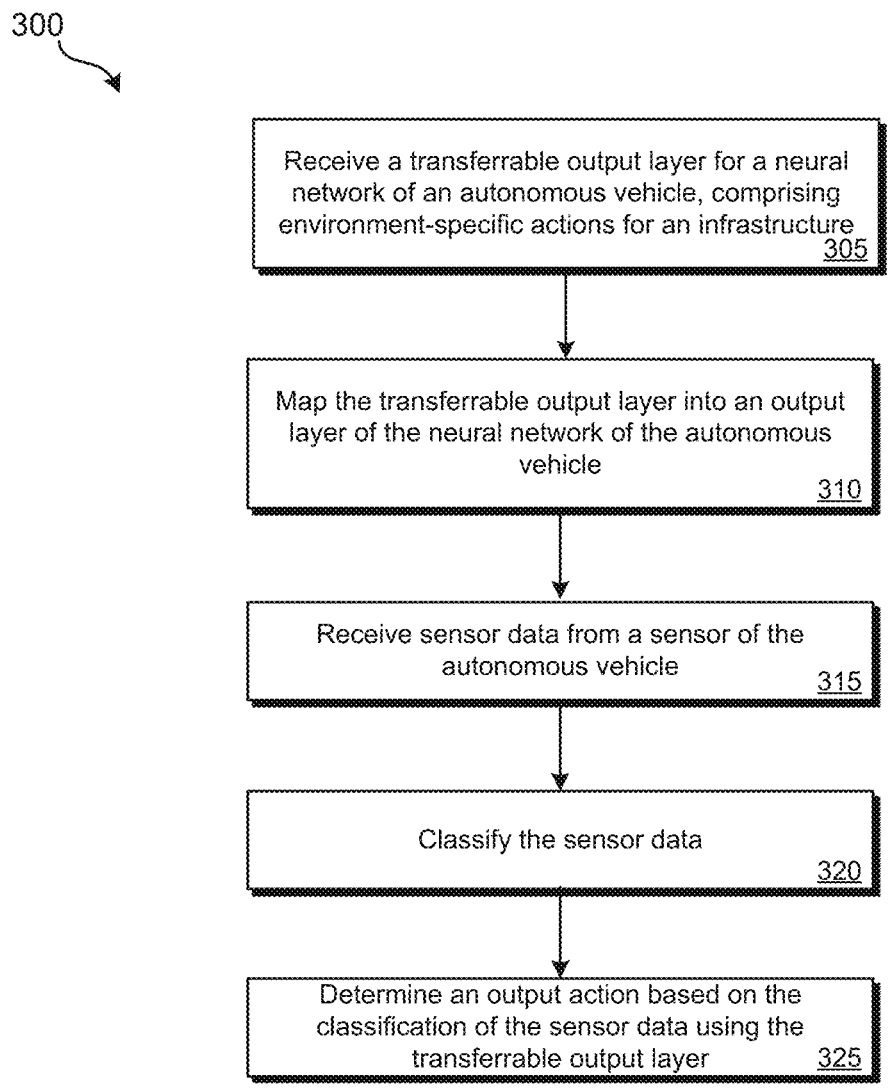
FIG. 3 illustrates a method for implementing context dependent transfer learning adaptation, according to embodiments.

FIG. 3 illustrates a method 300 for context dependent transfer learning adaptation according to embodiments. Method 300 may be performed by, for example, intelligence system 100 including autonomous vehicle 105 and infrastructure system 110, as described with respect to FIG. 1.

At step 305, a transferrable output layer is received by an autonomous vehicle. The transferrable output layer may be suitably chosen for a particular autonomous vehicle as dependent on both vehicle parameters as well as local environmental specific parameters. The transferrable output layer may be stored within infrastructure system 110, such as in transfer layer database 170. The transferrable output layer may be selected by subsystems within the infrastructure system such as memory 165, with a vehicle analysis subsystem 180 and transfer layer selection subsystem 175. The transferrable output layer may be received by a communication system of any suitable protocol.

At step 310, the transferrable output layer is mapped on to a neural network of autonomous vehicle 105. The neural network of an autonomous vehicle, such as autonomous vehicle 105 or autonomous vehicle 205, may have an output layer that transferrable output layer is mapped to, wherein a superset of outputs the autonomous vehicle 105 is capable of is filled in as parameters to the subset of actions of the transferrable output layer. Stated differently, the transferrable output layer includes actions that are specific to the infrastructure. For example, the infrastructure may include signs that are relevant to the infrastructure, such as a sign with a mouse walking in a DISNEY® environment. The transferable output layer may map the output of the mouse-crossing sign to a pedestrian crossing output known by the neural network of the vehicle.

At step 315, sensor data is received from a sensor of the autonomous vehicle. The sensor may be sensor 115, and the sensor data may be vision data from the exterior of autonomous vehicle 105. For example, sensor data may include signs, pedestrians, animals, other cars, road medians, and lane detection. Signs may be standard road signs or custom infrastructure-specific signs. For example, signs may be thematic, if in an amusement park, or may use a unique legend, such as a symbol or trademark for particular stores. The signs may also include a dynamically-updating sign, such as a sign that is powered by LEDs. The dynamically-updating sign may feed as an input into a sensor such as sensor 115.

At step 320, the sensor data is classified. The sensor data may be classified in the neural network of autonomous vehicle 105, such as through fixed neural network chip 130 and memory 135. The sensor data may be classified through a convolutional neural network for image classification. The convolutional neural network may be fully interconnected.

An example implementation of the above method may be for an autonomous vehicle approaching a sign saying "level closed" in a parking garage. The autonomous vehicle, as stated in step 305, may receive a transferable output layer for the parking garage, the transferable output layer having a mapping for a "level closed" sign. The autonomous vehicle may then map, as in step 310, the transferable output layer to the neural network of the autonomous vehicle. The "level closed" sign may be mapped to the output actions for a "do not enter" subset. The autonomous vehicle may then, using sensors, receive image data of the "level closed" sign, as in step 315. The neural network of autonomous vehicle may classify, as in step 320, the image as a "do not enter" set of data. In embodiments, the autonomous vehicle may implement the output actions in response to the "do not enter" set of data. For example, the autonomous vehicle may check rear sensors, honk the horn, and begin reversing the vehicle to perform a 3-point turn.

In embodiments, the neural network classifies the sensor data, which may occur across multiple hardware components, such as, for example, an ASIC chip and a hardware accelerator. The ASIC chip may be trained for classification of images received within the neural network's convolutional layer and pooling layer. The ASIC chip may be fixed neural network chip 130. The hardware accelerator, such as a GPU or FPGA, may be trained for the transferrable output layer received from infrastructure system 110. The ASIC chip may pass on the convoluted data to the transferrable output layer, which maps particular datasets to outputs of the transferrable output layer, using the capabilities of autonomous vehicle 105. The fixed portion of the neural network may consume lower energy and run more efficiently due to a reduced neural network size. The reduced neural network size may still accurately classify the images and obtain a desired output due to the transferrable output layer, which is offloaded to the infrastructure system 110, which assists lowering the computational and power toll required by the processor 120 of autonomous vehicle 105.

At step 325, an output is determined based on the classification of the sensor data using the transferrable output layer. The transferable output layer may be transfer layer 145. The transfer layer 145 may run off of a hardware accelerator, such as a GPU, FPGA or otherwise. Due to the transfer layer's context specific output, the autonomous vehicle 105 may have a different subset of actions using actions within the capability of the autonomous vehicle 105. For example, if infrastructure system 110 has a sign that is designated to "Maintain 3 yards behind next vehicle" in a pedestrian pickup area, autonomous vehicle 105 recognizes the sign due to the transfer layer 145. Transfer layer 145 may map actions from the superset of autonomous vehicle's capabilities, such as "gauge distance" and "drive." The resultant output would be autonomous vehicle 105 recognizing and properly providing an output to the input of the sign dictating to maintain 3 yards behind next vehicle. However, outside of infrastructure system 110, the neural network does not need to be trained to recognize the sign, thus saving bandwidth and computational power.

Figure 4A:
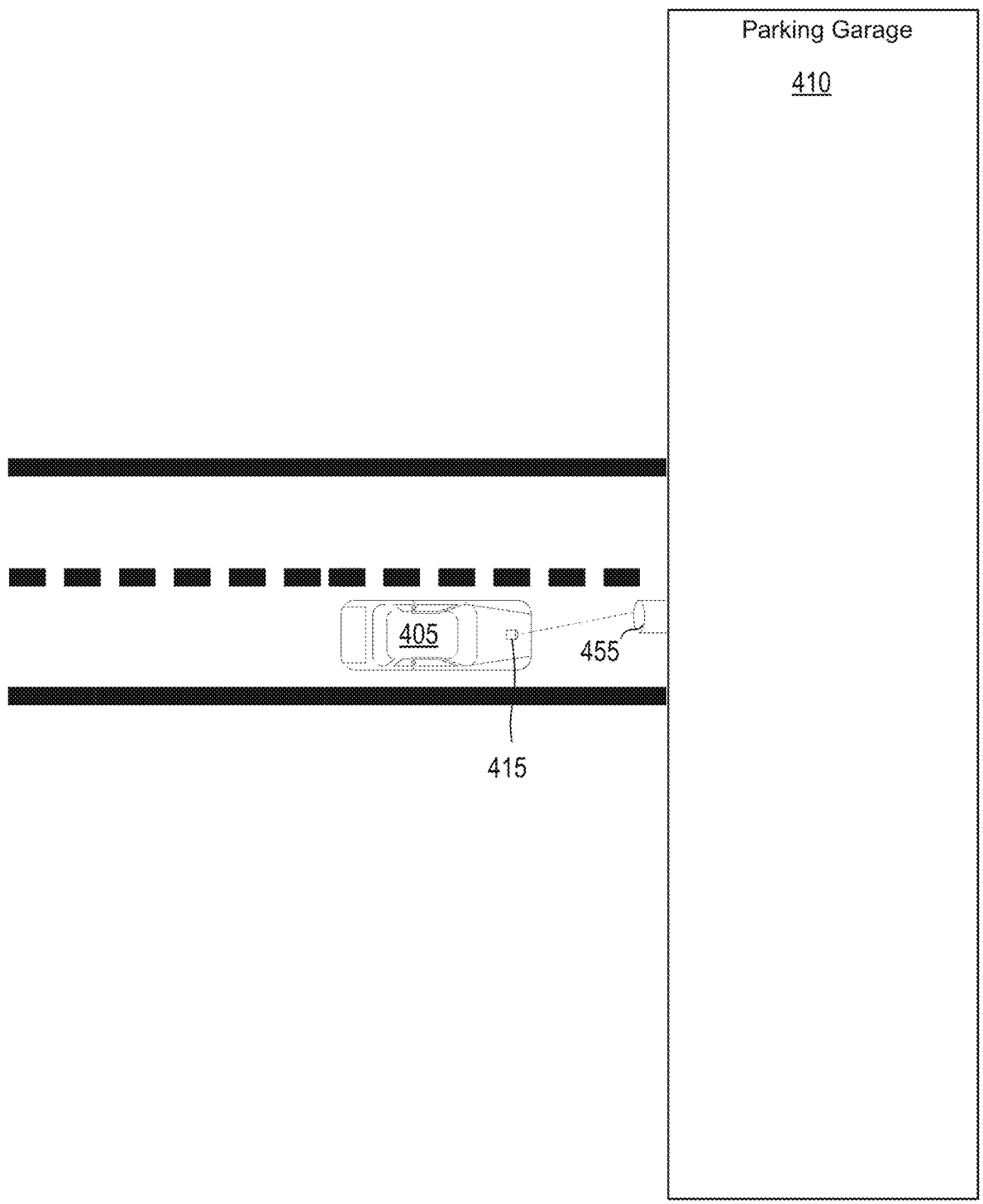
FIGS. 4A and 4B illustrate an autonomous vehicle exhibiting context dependent transfer learning adaptation within an infrastructure, according to embodiments.
Figure 4B:
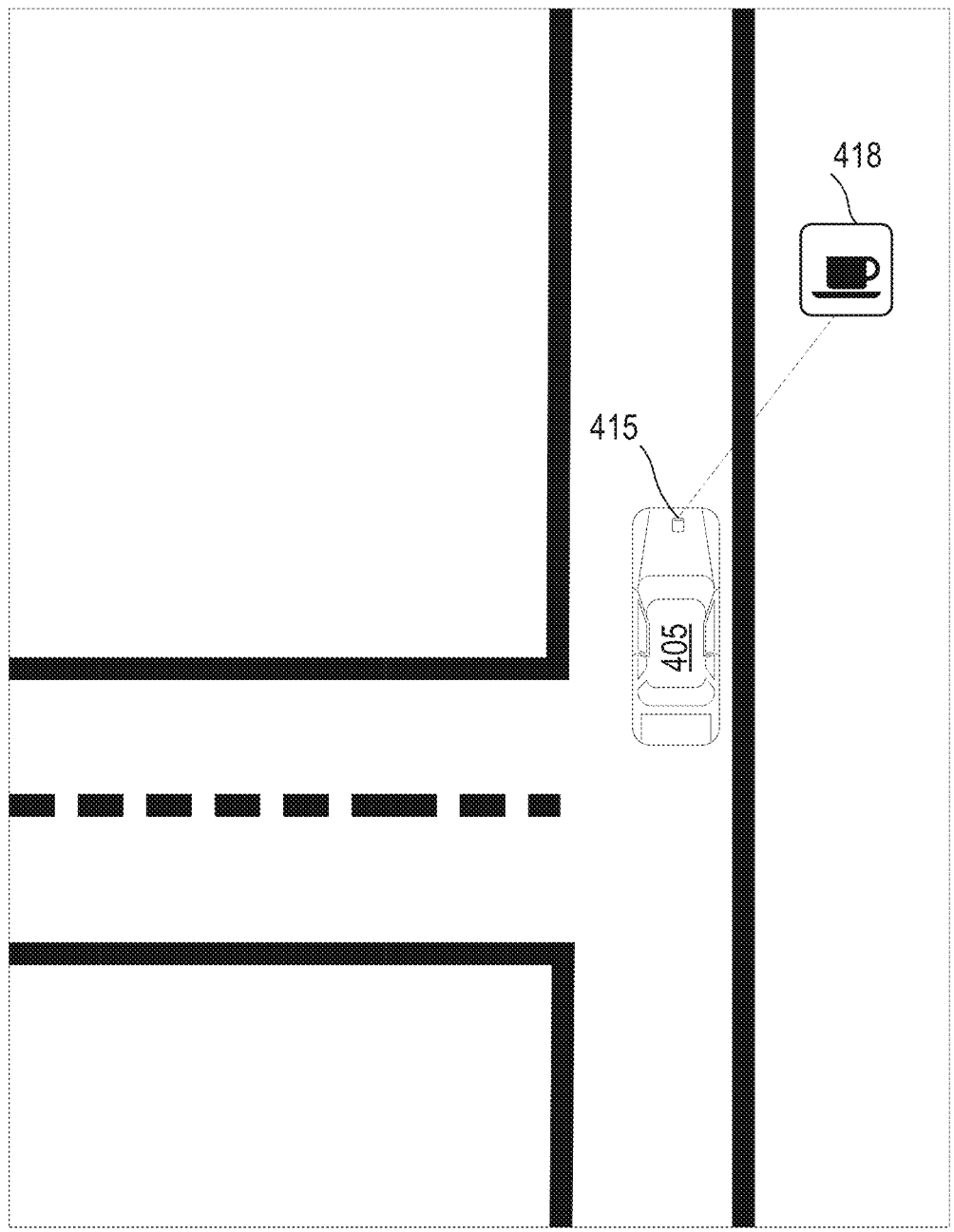

FIGS. 4A-4B illustrate a scenario of autonomous vehicle 405 demonstrating context dependent transfer learning adaptation within parking garage 410. Autonomous vehicle 405 may be autonomous vehicle 105 or autonomous vehicle 205. Parking garage 410 may be an infrastructure system 110 or infrastructure system 210. In FIG. 4A as autonomous vehicle 405 approaches parking garage 410, sensor 415 communicates with infrastructure sensor 455. Sensor 415 may be sensor 115. Infrastructure sensor 455 may be sensor subsystem 155. The vehicle may communicate with the parking garage by a suitable protocol, such as communication subsystem 125 and communication subsystem 150. After communicating, parking garage 410 selects an appropriate transferrable output layer for autonomous vehicle 405 based off of data autonomous vehicle 405 sent to parking structure 410. The transferrable output layer may be stored in a transfer layer database, such as transfer layer database 170. The transfer layer may be selected by protocols, such as for example, transfer layer selection subsystem 175 or vehicle analysis subsystem 180.

In FIG. 4B, autonomous vehicle 405 has entered parking garage 410. Sensor 415 sends input data from sign 418. Here, sign 418 is a coffee shop sign, which parking garage 410 may use to indicate a coffee shop, and thus, high foot traffic. Autonomous vehicle 405, when recognizing the sign, may use the transferrable output layer to map particular actions, such as "drive to the left" or otherwise as appropriate. Autonomous vehicle 405 may map the actions by a mapping subsystem, such as a mapping subsystem 140. While sign 418 is shown here as a coffee shop sign, sign 418 may be any context-specific local sign or regulation.

In embodiments, autonomous vehicle 405 is driving through parking garage 410 at night. Parking garage 410 may instead select a transferrable output layer that is trained for nighttime input recognition, with a neural network output that allows autonomous vehicle 405 to recognize sign 418 with greater accuracy without a more expansive neural network to accommodate for additional parameters. By avoiding a more expansive neural network, the computational toll on the processor of autonomous vehicle 405 is reduced.

Figure 5:
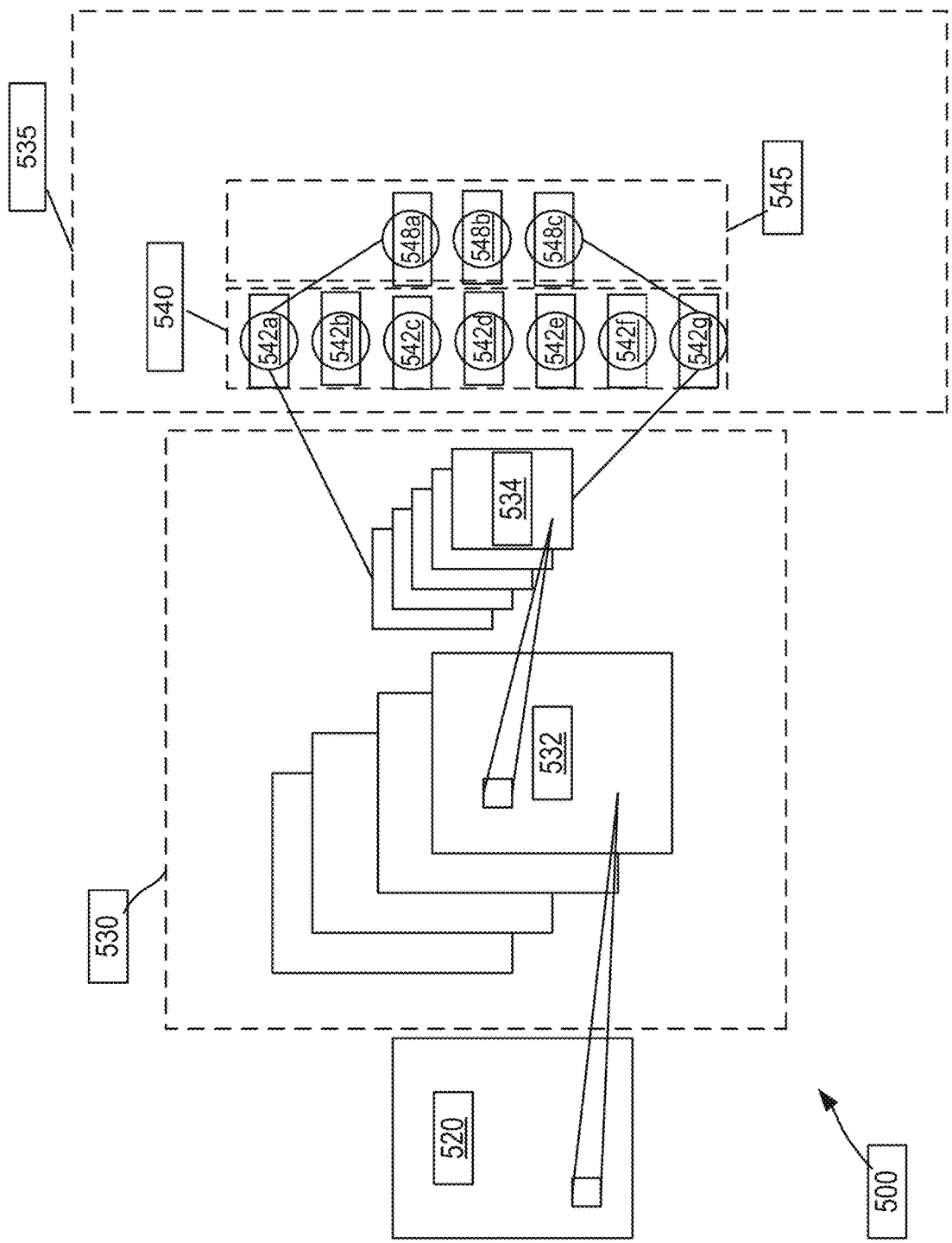
FIG. 5 illustrates a neural network, according to embodiments.

FIG. 5 illustrates a neural network according to embodiments. A neural network 500 has input data 520, ASIC chip 530, and hardware accelerator 535. ASIC chip 530 may be fixed neural network chip 130. Hardware accelerator may hold transfer layer 145. Neural network 500 may be fully interconnected. ASIC chip 530 has hidden layers of the neural network in convolutional layer 532 and pooling layer 534. Hardware accelerator 535 has feature set 540 and transferrable output layer 545.

ASIC chip 530 may be trained to perform image classification on input data 520. Because in an autonomous vehicle, such as autonomous vehicle 105, the sensor will constantly be updating with image classification, this portion of the neural may be fixed on a chip meant for that particular purpose. By putting the fixed portion of the neural network on ASIC chip 530, power consumption of the overall neural network is reduced. ASIC chip 530 may classify input data received by running the data through convolutional layer 532 and pooling layer 534. Convolutional layer 532 may have multiple feature maps. While FIG. 5 shows one convolutional layer, the neural network in other embodiments may have more than one convolutional layer such as two or three layers. After the data is convoluted, it may be downsampled to pooling layer 534. The downsampling may be by average pooling or by max pooling. The pooling layer 534 outputs a feature set 540.

Hardware accelerator 535 may be a GPU, FPGA, or otherwise, as suitable for loading neural network models. Hardware accelerator 535 is shown with two layers, but in some embodiments, hardware accelerator 535 may have 1, 3, or more layers as suitable. The feature set 540 from pooling layer 534 may be passed to hardware accelerator 535, where it is mapped to a transferrable output layer 545. Thus, for particular classifications, context-specific outputs are obtained through the downloaded transferrable output layer 545. In some embodiments, all transferrable portions of the neural network 500 may reside on hardware accelerator 535 and include one, two, or more layers and/or all portions of the neural network 500 residing on hardware accelerator 535 may be transferrable. For example, in some embodiments, feature set 540 and transferrable output layer 545 may both be replaced, for example, by an infrastructure system such as infrastructure system 110. In the above embodiment, the transferred feature set 540 would then pull from pooling layer 534.

The transferrable output layer 545 may consist of outputs 548a, 548b, and 548c. The transferable output layer 545 may pull from the feature maps 540, with specific feature maps 542a, 542b, 542c, 542d, 542e, 542f, and 542g to determine the output of the transferable output layer 545. For example, fully interconnected feature map 542a may lead to transferable output layer output 548a.

Figure 6:
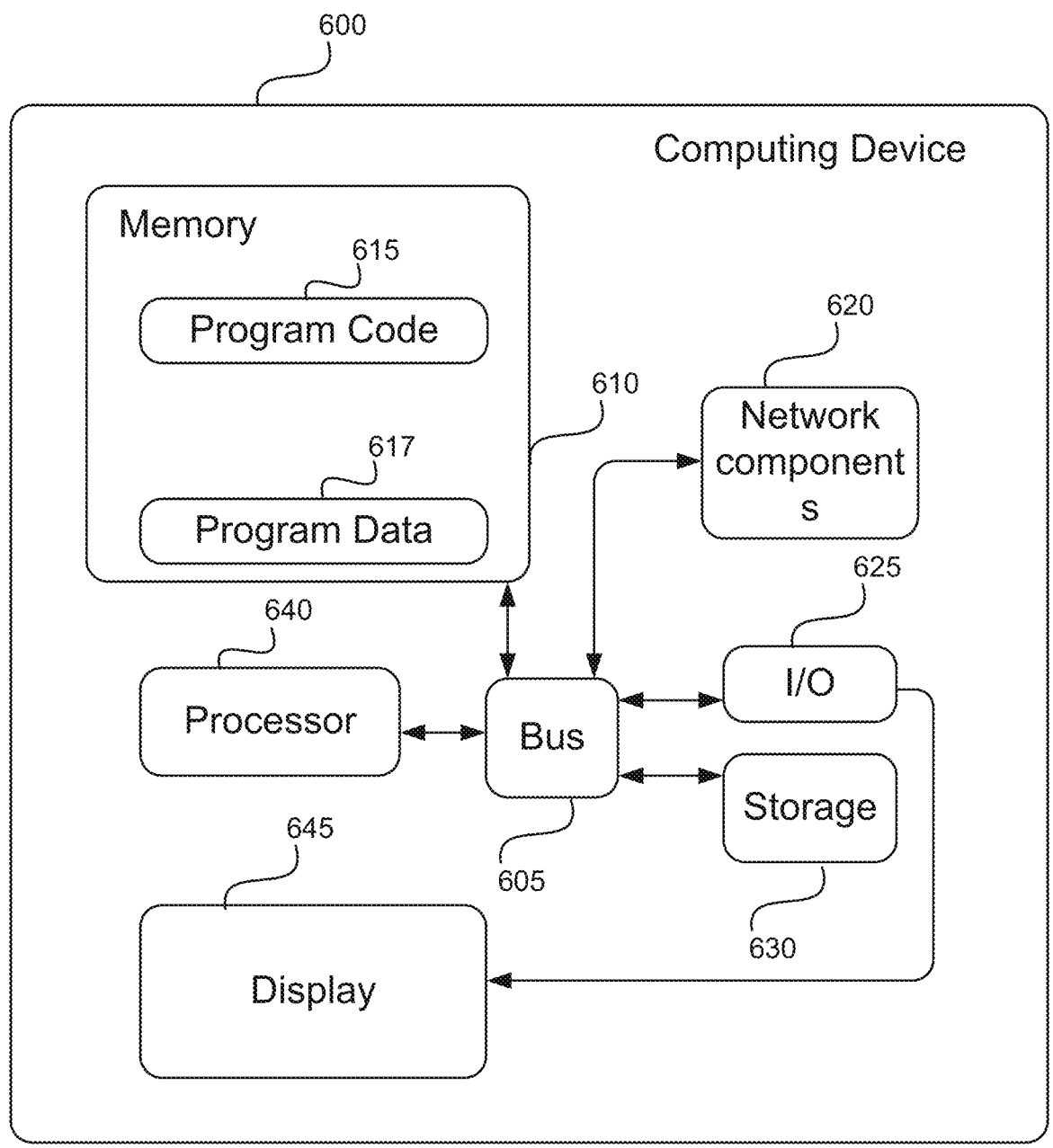
FIG. 6 illustrates a computer system according to embodiments.
Figure 7:
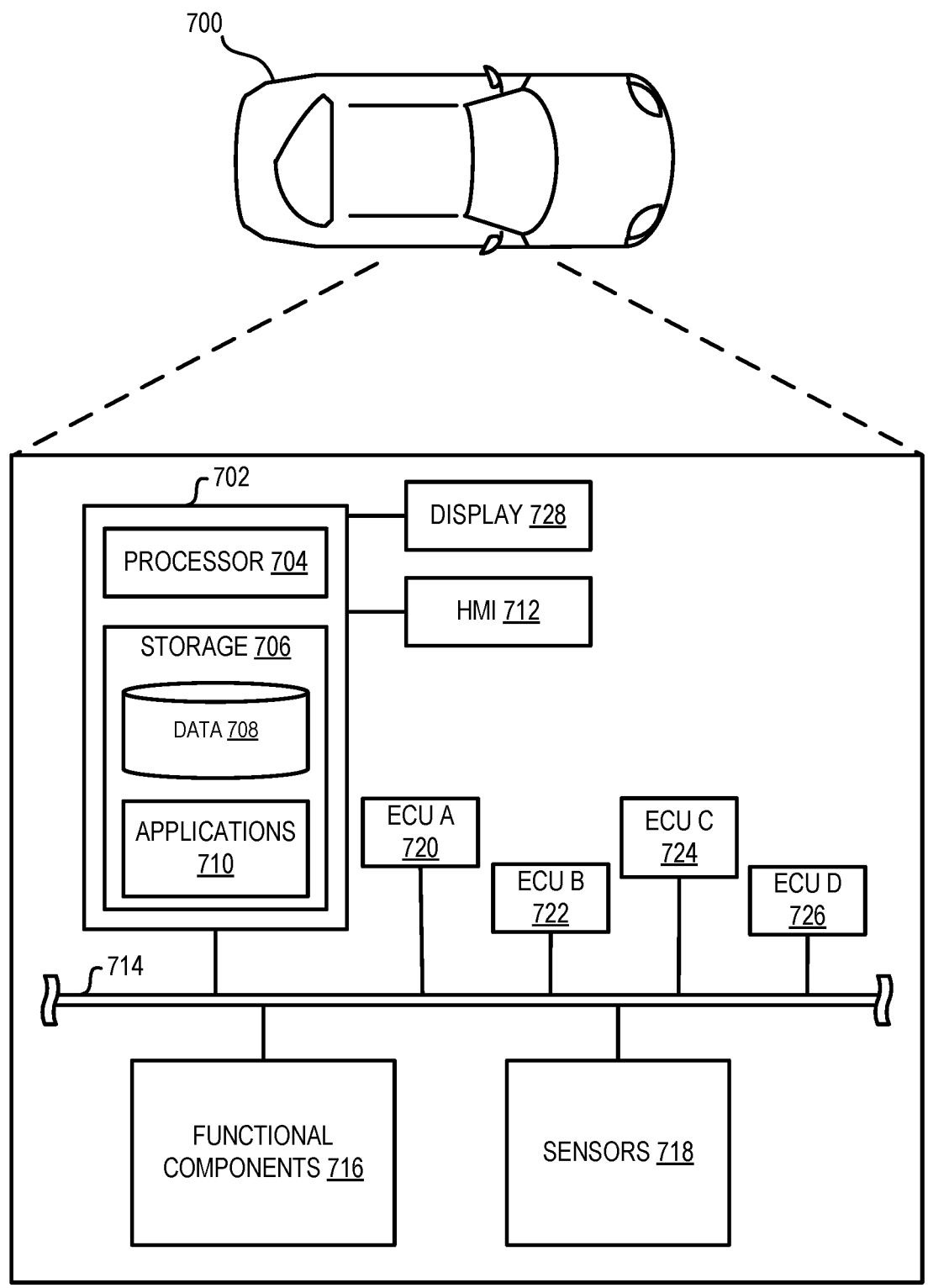
FIG. 7 illustrates a vehicle system according to embodiments.

Any suitable computing system or group of computing systems can be used for performing the operations or methods described herein. For example, FIG. 6 depicts an example of a computing device 600 that may be at least a portion of computing system 602. FIG. 7 illustrates a vehicle system including a computing system 702 as well as multiple ECUs which may perform some or all of the functions described herein.

FIG. 6 illustrates a block diagram of an example of a computing device 600. Computing device 600 can be any of the described computers herein including, for example, computing system 702 within the vehicle system 700 of FIG. 7 as well as ECUs 720, 722, 724, 726. The computing device 600 can be or include, for example, an integrated computer, a laptop computer, desktop computer, tablet, server, or other electronic device.

The computing device 600 can include a processor 640 interfaced with other hardware via a bus 605. A memory 610, such as RAM, ROM, EEPROM, or the like, can embody program components (e.g., program code 615) that configure operation of the computing device 600. Memory 610 can store the program code 615, program data 617, or both. In some examples, the computing device 600 can include input/output ("I/O") interface components 625 (e.g., for interfacing with a display 645, keyboard, mouse, and the like) and additional storage 630.

The computing device 600 executes program code 615 that configures the processor 640 to perform one or more of the operations described herein. The program code 615 may be resident in the memory 610 and may be executed by the processor 640 or any other suitable processor.

The computing device 600 may generate or receive program data 617 by virtue of executing the program code 615. For example, sensor data, trip counter, authenticated messages, trip flags, and other data described herein are all examples of program data 617 that may be used by the computing device 600 during execution of the program code 615.

The computing device 600 can include network components 620. Network components 620 can represent one or more of any components that facilitate a network connection. In some examples, the network components 620 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts a computing device 600 with a processor 640, the system can include any number of computing devices 600 and any number of processor 640. For example, multiple computing devices 600 or multiple processor 640 can be distributed over a wired or wireless network (e.g., a Wide Area Network, Local Area Network, or the Internet). The multiple computing devices 600 or multiple processor 640 can perform any of the steps of the present disclosure individually or in coordination with one another.

FIG. 7 illustrates a block diagram of a vehicle system 700, according to some embodiments. The vehicle system 700 may include a computing system 702 configured to communicate over an in-vehicle network 714. The computing system 702 includes a processor 704 and storage 706. While a vehicle system 700 is shown in FIG. 7, the example components as illustrated are not intended to be limiting. Indeed, the vehicle system 700 may have more or fewer components, and additional or alternative components and/or implementations may be used. It should be noted that the use of a vehicle system 700 environment is illustrative, as the functional safety measures and security measures may be utilized in other types of systems such as flight control system in an airplane, or a medical device or industrial machine.

The vehicle system 700 may include various types of automobile, crossover utility vehicle (CUV), sport utility vehicle (SUV), truck, recreational vehicle (RV), boat, plane or other mobile machine for transporting people or goods. In many cases, the vehicle system 700 may be powered by an internal combustion engine. As another possibility, the vehicle system 700 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 700 may vary, the capabilities of the vehicle system may correspondingly vary. As some other possibilities, vehicle system 700 may have different capabilities with respect to passenger capacity, towing ability and capacity, and storage volume.

The computing system 702 may include a Human Machine Interface (HMI) 712 and a display 728 for user interaction with the computing system 702. An example computing system 702 may be the SYNC™ system provided by FORD MOTOR COMPANY™ of Dearborn, Mich. In some examples the display 728 may include a vehicle infotainment system including one or more displays. The HMI 712 may be configured to support voice command and BLUETOOTH™ interfaces with the driver and driver carry-on devices, receive user input via various buttons or other controls, and provide vehicle status information to a driver or other vehicle system 700 occupants. For instance, the computing system 702 may interface with one or more buttons or other HMI 712 configured to invoke functions on the computing system 702 (e.g., steering wheel audio buttons, a push-to-talk button, instrument panel controls, etc.). The computing system 702 may also drive or otherwise communicate with the display 728 configured to provide visual output to vehicle occupants, e.g., by way of a video controller. In some cases, the display 728 may be a touch screen further configured to receive user touch input via the video controller, while in other cases the display 728 may be a display only, without touch input capabilities. In an example, the display 728 may be a head unit display included in a center console area of the vehicle system 700. In another example, the display 728 may be a screen of a gauge cluster of the vehicle system 700.

The computing system 702 may further include various types of computing apparatus in support of performance of the functions of the computing system 702 described herein. In an example, the computing system 702 may include one or more processors 704 configured to execute computer instructions, and a storage 706 medium on which computer-executable instructions and/or data may be maintained. A computer-readable medium (also referred to as a processor-readable medium or storage 706) includes any non-transitory (e.g., tangible) medium that participates in providing data (e.g., instructions) that may be read by a computer (e.g., by the one or more processors 704). In general, the processor 704 receives instructions and/or data, e.g., from the storage 706, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 706 may include divisions for data 708 and applications 710. The data 708 may store information such as databases and other such information. The applications 710 may store the computer-executable instructions or other such instructions executable by the processor 704.

The computing system 702 may be configured to communicate with mobile devices of the vehicle system 700 occupants. The mobile devices may be any of various types of portable computing device, such as cellular phones, tablet computers, smart watches, laptop computers, portable music players, or other devices capable of communication with the computing system 702. As with the computing system 702, the mobile device may include one or more processors configured to execute computer instructions, and a storage medium on which the computer-executable instructions and/or data may be maintained. In some examples, the computing system 702 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 702 may communicate with the mobile device over a wired connection, such as via a USB connection between the mobile device and a Universal Serial Bus (USB) subsystem of the computing system 702.

The computing system 702 may be further configured to communicate with other components of the vehicle system 700 via one or more in-vehicle networks 714. The in-vehicle networks 714 may include one or more of a vehicle controller area network (CAN), an Ethernet network, or a media oriented system transfer (MOST), as some examples. The in-vehicle networks 714 may allow the computing system 702 to communicate with other units of the vehicle system 700, such as ECU A 720, ECU B 722, ECU C 724, and ECU D 726. The ECUs 720, 722, 724, and 726 may include various electrical or electromechanical systems of the vehicle system 700 or control various subsystems of the vehicle system 700. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 700); a radio transceiver module configured to communicate with key fobs or other vehicle system 700 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 700 location and heading information, and various other vehicle ECUs configured to corporate with the computing system 702. The subsystems controlled by the various ECUs may include functional components 716 of the vehicle system 700 including elements such as the powertrain, engine, brakes, lights, steering components, and the like. Additionally, some or all of the functional components 716 may include sensors 718 as well as additional sensors equipped to the vehicle system 700 for detecting various states, positions, proximity, temperature, and the like of the vehicle system 700 and subsystems thereof. The ECUs 720, 722, 724, 726 may communicate with the computing system 702 as well as the functional components 716 and the sensors 718 over the in-vehicle network 714. While only four ECUs are depicted in FIG. 7, any number (more or fewer) of ECUs may be included in vehicle system 700.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method, comprising:
storing, by a computer system of an autonomous vehicle on an application-specific integrated circuit chip of the autonomous vehicle, a fixed portion of a neural network;
receiving, by the computer system of the autonomous vehicle, a transferrable output layer for the neural network of the autonomous vehicle, the transferrable output layer comprising environment-specific actions for an infrastructure, wherein the transferrable output layer is compatible with the fixed portion of the neural network;
temporarily storing, by the computer system, the transferrable output layer on a hardware accelerator of the autonomous vehicle;
mapping, by the computer system, the transferrable output layer into an output layer of the neural network of the autonomous vehicle;
receiving, at the computer system, sensor data from a sensor of the autonomous vehicle;
classifying, by the neural network of the autonomous vehicle, the sensor data, wherein the fixed portion and the transferrable output layer are interconnected in the neural network; and,
determining, at the computer system, an output action based on the classification of the sensor data using the transferrable output layer interconnected with the fixed portion of the neural network.

2. The method of claim 1, wherein the sensor comprises a vision sensor.

3. The method of claim 1, wherein the transferrable output layer is received from the infrastructure and the infrastructure comprises a parking garage.

4. The method of claim 1, wherein the transferrable output layer is received from the infrastructure and the infrastructure comprises a geofence area.

5. The method of claim 1, further comprising, controlling, by the computer system, electrical or electromechanical systems of the autonomous vehicle to execute the output action.

6. The method of claim 1, further comprising:
displaying, by the computer system, the output action on a visual display of the autonomous vehicle.

7. The method of claim 1, further comprising:
connecting, by the computing system, to a wireless network of the infrastructure;
transmitting, by the computer system, information associated with at least the fixed portion of the neural network of the autonomous vehicle; and
requesting, by the computing system, the transferrable output layer compatible with the fixed portion of the neural network from the infrastructure via a wireless connection with the infrastructure.

8. The method of claim 1, wherein mapping the transferrable output layer into the output layer of the neural network comprises:
storing the environment-specific actions into the hardware accelerator of the computer system; and
configuring a field programmable gate array to map output actions of the neural network to the environment-specific actions.

9. The method of claim 1, wherein a subsequent transferrable output layer received at a later time replaces the transferrable output layer on the hardware accelerator of the autonomous vehicle.

10. A system, comprising:
an application-specific integrated circuit storing a fixed portion of a neural network;
a hardware accelerator configured to temporarily store a transferrable output layer compatible with the fixed portion of the neural network;
one or more processors; and,
a system memory, the system memory storing instructions to cause the one or more processors to:
receive a transferrable output layer for a neural network of an autonomous vehicle, the transferable output layer comprising environment-specific actions for an infrastructure;
temporarily store the transferrable output layer on the hardware accelerator of the autonomous vehicle;
map the transferrable output layer into an output layer of the neural network of the autonomous vehicle;
receive sensor data from at least one sensor of the autonomous vehicle;
classify the sensor data, wherein the fixed portion and the transferrable output layer are interconnected in the neural network; and
determine an output action based on the classification of the sensor data using the transferrable output layer interconnected with the fixed portion of the neural network.

11. The system of claim 10, wherein the application-specific integrated circuit configured to receive and process the sensor data.

12. The system of claim 10, wherein the one or more processors comprises a graphics processing unit.

13. The system of claim 10, wherein the one or more processors comprises a field programmable gate array.

14. The system of claim 10, wherein the at least one sensor comprises a vision sensor.

15. The system of claim 10, wherein the classification of the sensor data is based on conditions of a local environment.

16. The system of claim 10, wherein the transferable output layer is received from the infrastructure, and the infrastructure comprises a parking garage.

17. The system of claim 10, wherein the transferable output layer is received from the infrastructure, and the infrastructure comprises a geofence area.

18. An infrastructure comprising:
a database, storing at least one transferable output layer for a neural network of an autonomous vehicle;
a sensor for receiving data;
a communication system configured to transfer the at least one transferable output layer to the autonomous vehicle; and
a memory, the memory storing instructions to:
analyze the autonomous vehicle using the sensor of the infrastructure;
determine information associated with at least a fixed portion of the neural network of the autonomous vehicle stored locally on an application-specific integrated circuit of the autonomous vehicle;
select a suitable transferable output layer for the autonomous vehicle based on the determined information, wherein the transferrable output layer is compatible with the fixed portion of the neural network of the autonomous vehicle;
send the transferable output layer to the autonomous vehicle to be temporarily stored on a hardware accelerator of the autonomous vehicle.

19. The infrastructure of claim 18, wherein the sensor receives data comprising weather conditions of the local environment.

20. The infrastructure of claim 18, wherein the received data comprises a mode of the autonomous vehicle.

* * * * *